United States Patent Office 3,298,413
Patented Jan. 17, 1967

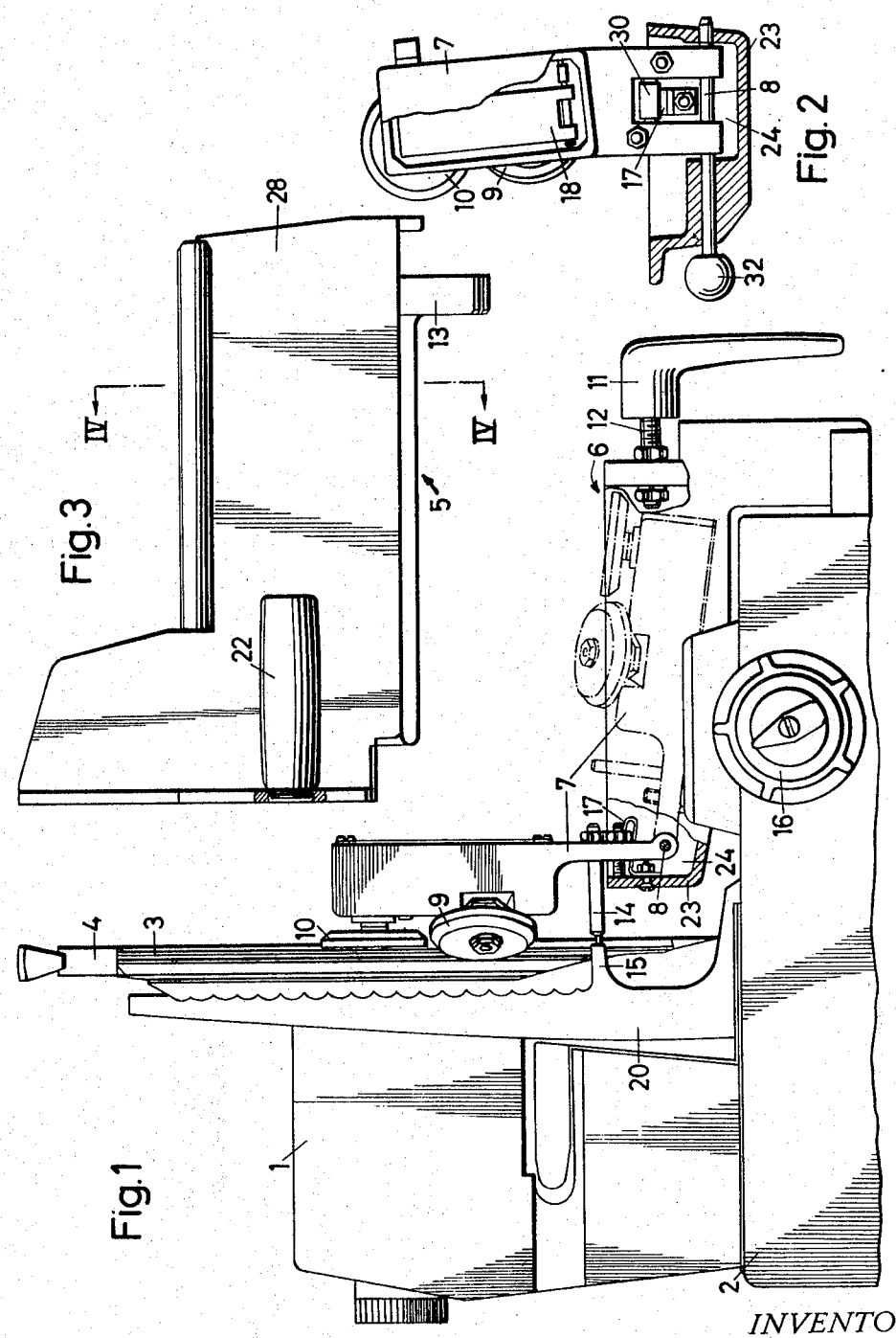

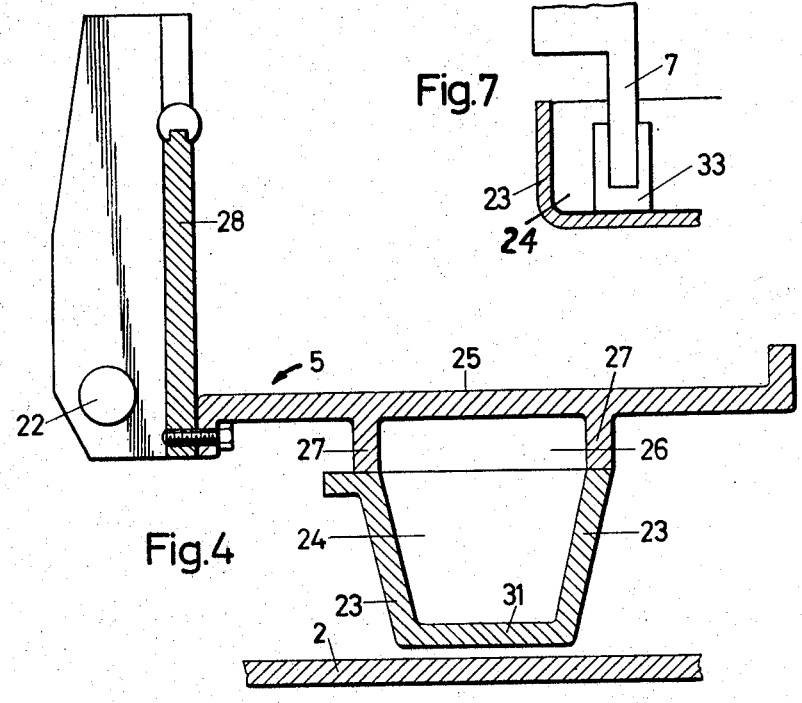
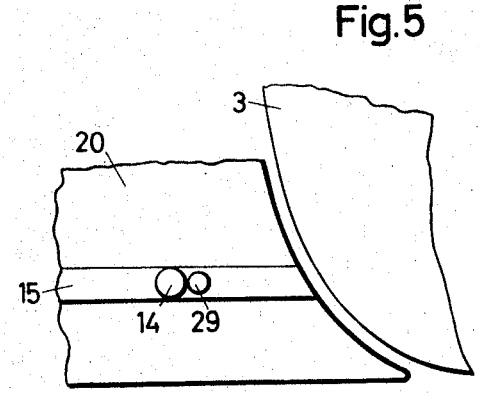
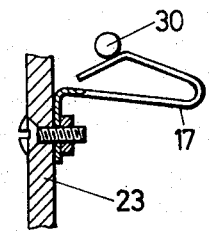

3,298,413
SLICING MACHINE HAVING KNIFE
SHARPENING MEANS
Walter Engi, Zurich, Switzerland, assignor to
Adolf Ditting, Zurich, Switzerland
Filed Aug. 7, 1964, Ser. No. 388,103
Claims priority, application Switzerland, Aug. 16, 1963,
10,162/63
6 Claims. (Cl. 146—102)

The present invention relates to a slicing machine for meat and sausage and, more specifically, concerns a machine of this type with a motor driven circular knife and a reciprocable carriage having mounted thereon a grinding apparatus for grinding the circular knife. It is known to connect such grinding apparatus to the knife guard or to the stationary housing of the machine. Such an arrangement, however, has the drawback that the grinding apparatus is, to a large extent, exposed to soiling, and furthermore, additional special guiding means are required for assuring a proper feeding movement. In order to prevent such grinding apparatus from interfering with the ordinary slicing operation, it is customary to mount such grinding apparatus at the rear of the machine. Such an arrangement, however, has the drawback that it increases the accident rate because the operator, when intending to carry out a grinding operation or to clean the apparatus, has to move his hand over the entirely unprotected portion of the circular knife.

It is also known detachably to connect the grinding apparatus to the carriage so that the grinding apparatus may be removed from the machine after it has completed its respective grinding operation. Such a construction, however, has the drawback that a special drawer or shelf is necessary for the grinding apparatus. In addition thereto, there exists the danger that the grinding disc, which is liable to break, may be damaged while storing by articles close to the grinding apparatus.

It is, therefore, an object of the present invention to provide a slicing machine for meat and sausage, which will overcome the above-mentioned drawbacks.

It is another object of this invention to provide a slicing machine for meat and sausage with a grinding apparatus which will make it possible, after completion of a grinding operation, to move the grinding apparatus out of the way of the normal cutting manipulations to be carried out by an operator while storing the grinding apparatus within reach of the operator and without the requirement of special drawers or shelves.

These and other objects and advantages of the invention will appear more clearly from the following specification in connection with the accompanying drawings, in which:

FIGURE 1 is a front view and partially a section of a slicing machine according to the present invention with the upper portion of the carriage thereof removed;

FIGURE 2 represents a section along the line II—II of FIGURE 1, said section being taken through the connecting portion of the grinding apparatus in the lower portion of the machine;

FIGURE 3 is a view of the lifted-off upper portion of the machine;

FIGURE 4 is a section taken through the upper portion of the machine along the line IV—IV of FIGURE 3, and also shows a section through the grinding apparatus receiving chamber of FIG. 1.

FIGURE 5 shows a detail with the abutments for limiting the stroke of the carriage.

FIGURE 6 shows a detail of the spring means for arresting the grinding apparatus in the upright position.

FIGURE 7 is a fragmental section of a modified form for fixing the grinding apparatus.

The slicing machine according to the present invention and equipped with a grinding apparatus or sharpening device for grinding a circular knife is characterized primarily in that the grinding apparatus, when not in use, is located in a recess below the surface which supports the meat or sausage to be sliced. This recess or chamber may be located either in the upper portion of the carriage, in the lower portion of the carriage, or partially in the upper portion and partially in the lower portion of the carriage.

In this wall, the grinding apparatus will be stored at a definite place within the machine while at the same time the arrangement will be able fully to enjoy the advantages inherent to the mounting of the grinding apparatus on the carriage. Of these advantages is to be mentioned primarily that the grinding apparatus can be fed very sensitively against the circular knife without the necessity of providing additional guiding means inasmuch as the guiding means for the carriage can be taken advantage of in this connection. Furthermore, the grinding apparatus will be well protected against soiling and damage.

Referring now to the drawings in detail, the slicing machine illustrated therein is intended for slicing meat and sausage, for instance cold cuts. The slicing machine comprises a table or plate 25 upon which the material to be cut is placed. Plate 25 forms a part of a carriage 5, 6 adapted manually to be reciprocated. The slicing machine according to the invention particularly comprises a motor housing 1, a base 2 and a rotatable motor-driven circular knife 3. Circular knife 3 has its rearward side covered in customary manner by a knife-guard 4. Carriage 5, 6 which is reciprocably supported by two straight bars (not shown) for straight movement, has two sections, viz. an upper section 5 and a lower section 6. The upper section 5 is detachable from lower section 6 and may be lifted off the latter. By lifting section 5 off section 6, the grinding apparatus 7 will be accessible, which forms a part of the machine according to the invention and serves for grinding the circular knife. Grinding apparatus 7 is shown in the drawing in its operative position in full-lines, and in its inoperative position in dot-dash lines. In the last-mentioned instance, the grinding apparatus is shown as resting in a recess or chamber of carriage 5, 6. Grinding apparatus 7 is tiltably or pivotally journalled in the carriage section 6 so as to be tiltable about a bolt 8, which latter is parallel to the knife plane and may be horizontal or slightly inclined. At the end of the bolt 8 a knob or handle 32 is fixed. By axial movement of the bolt and handle the grinding apparatus can be detached.

Grinding apparatus 7 is provided with a lower grinding disc 9 and an upper disc 10 also called whetstone, for removing the grinding burr. The two discs 9 and 10—which are driven from the knife 3 during grinding—are in mutually dependent position so that when feeding the grinding disc 9 toward the circular knife 3 as a result of the corresponding feeding movement of carriage 5, 6 by means of a tiltable lever 18 (FIG. 2) common to and acting upon the two grinding disc shafts, disc 10 will be moved toward knife 3. Such a sharpening device is in detail explained in my copending patent application Ser. No. 178,387, filed March 8, 1962, now Patent No. 3,182,700. However, it would also be possible, instead of automatically feeding disc 10, to feed disc 10 by finger pressure upon the rearward resilient shaft end or by a tilting movement of a manually operable lever, described by example in Patent 1,939,754.

After the grinding apparatus has been folded back into its non-operative position, the grinding apparatus will rest lowered in a recess or chamber of the lower section 6 of the carriage. Thereupon, the carriage upper section 5 is mounted on the lower section 6 and is clamped thereonto. Also, the carriage upper section 5 is provided with a recess 26 for partially receiving grinding discs 9 and 10. Carriage upper section 5 provided with a handle 22 has a plate 25 referred to above, with a substantially horizontal surface for receiving the material to be cut. In addition thereto, carriage section 5 has a vertically extending abutment plate 28. The bottom side of plate 25 is provided with ribs 27 which laterally confine a prismatic chamber 26. Recess 24 pertaining to the lower section 6 of the carriage and located below prismatic or pyramidic recess 26 is confined by walls 23 and a bottom 31. Bottom 31 is somewhat inclined so that the depth of recess 24 increases with increasing distance from bolt 8.

For fixedly holding the carriage upper section 5 to the lower section 6, there is provided a manually operable lever 11 which is mounted on a threaded bolt 12 to be straddled by a downwardly directed extension 13 rigidly connected to the upper section 5. It will be understood that also a reverse arrangement could be employed according to which lever 11 is mounted on the upper section of the carriage, whereas extension 13 is mounted on the bottom section 6 of the carriage.

Firmly connected to the grinding apparatus 7 is an abutment bolt 14 which is intended for cooperation with a rib 15 on the abutment plate 20. This cooperation is brought about when the grinding apparatus is turned upwardly into its operative position. The arrangement is such that the vertical, i.e. approximately vertical operational position of the grinding apparatus 7 can be obtained only when the abutment plate 20, which in customary manner is laterally displaceable, is in its rear end position, i.e. when said adjusting plate 20 has previously been adjusted by an adjusting head 16 by means of which the thickness of the slices to be cut may be adjusted. However, the arrangement may also be modified so that the proper position of operation of the grinding apparatus 7 will be obtained only by adjusting the front end position for the least slice thickness. The arrangement furthermore comprises an arresting spring 17 which brings about that the grinding apparatus 7 is held in its correct upright position only when previously the above-mentioned end position of the abutment plate 20 has been adjusted and the grinding apparatus in intermediate positions of the abutment plate, which positions would interfere with a proper grinding, drops back into non-operative position inasmuch as spring 17 does not latch behind bolt 30 in said intermediate positions, as shown in FIG. 6.

The feeding movement of the carriage in the direction toward the circular knife 3 is limited by a bolt 29 or a shoulder on rib 15 which is engaged by bolt 14 (FIG. 5) when the grinding apparatus 7 is tilted into its upright or operative position. In this way, carriage 5, 6 and thus the grinding apparatus 7, is prevented from being pushed too far against grinding disc 9 so that damage to the knife edge at the shaft or connecting nut of the grinding disc 9, will be prevented. Inasmuch as the radial distance of circular knife 3 from abutment plate 20 must also with a used knife, i.e. a knife which has a reduced diameter, in view of periodic post-grinding, always be held to approximately 0.5 to 1 millimeter, simultaneously also a correction of the abutment depth for the carriage will be obtained with increasing reduction of the knife diameter, without the necessity of further adjusting anything on the grinding apparatus or the abutments 14 or 29.

Instead of a tiltable connection of the grinding apparatus, also a detachable introduceable connection would be possible as shown in FIG. 7. In this instance, the grinding apparatus, when it is not to be used, would be loosely placed into the recess between the carriage upper section and lower section, whereas when the grinding apparatus is to be employed, it would be introduced into prepared holding means 33 in the carriage lower section.

Instead of having the upper and lower sections of the carriage provided with a recess for receiving the grinding apparatus, it is also possible to provide a corresponding recess either in the upper or the lower section only for receiving the grinding apparatus in its entirety.

According to still another modification of the present invention, the carriage may be designed as a one-piece carriage and may have its plate 25 or a part of its plate 25 for receiving the material to be cut equipped with a slide adapted to be pulled out or a tiltable cover which, after being pulled out or being tilted, will free the grinding apparatus in a recess of the carriage so that said grinding apparatus can be tilted upwardly in the same manner as described above.

The invention is also applicable to cutting machines with inclined table and cutting knife (gravity feed type) as shown by example in Patent No. 2,598,740.

It is of course to be understood that the present invention is, by no means, limited to the particular constructions shown in the drawings and referred to in the specification but also comprises any modifications within the scope of the appended claims.

What I claim is:

1. In a slicing machine for meat and sausage: supporting means, a motor-operable circular slicing knife carried by said supporting means, a carriage reciprocably supported by said supporting means and provided with recess means, said carriage being movable selectively toward and away from said slicing knife, grinding means for grinding said slicing knife, a supporting member rotatably supporting said grinding means, and pivot means pivotally connecting said supporting member to said carriage to permit tilting of said supporting member and the grinding means carried thereby from a lying position in which said supporting member is at least partially located in said recess means to a certain upright position in which said grinding means is in a position to grind said slicing knife, and vice versa.

2. A slicing machine according to claim 1, in which said carriage has a lower section and an upper section detachably connected to said lower section, and in which at least one of said sections forms at least a portion of said recess means.

3. In a slicing machine for meat and sausage: supporting means, a motor-operable circular slicing knife carried by said supporting means, a carriage reciprocably supported by said supporting means and provided with recess means, said carriage being movable selectively toward and away from said slicing knife, grinding means for grinding said slicing knife, a supporting member rotatably supporting said grinding means, and a pivot at least approximately parallel to the plane of said slicing knife and detachably connecting said supporting member to said carriage to permit tilting of said supporting member and the grinding means carried thereby from a lying position in which said supporting member is at least partially located in said recess means to a certain upright position in which said grinding means is in a position to grind said slicing knife, and vice versa.

4. In a slicing machine for meat and sausage: supporting means, a motor-operable circular slicing knife carried by said supporting means, a carriage reciprocably supported by said supporting means and provided with recess means, said carriage being movable selectively toward and away from said slicing knife, grinding means for grinding said slicing knife, a supporting member rotatably supporting said grinding means, pivot means pivotally connecting said supporting member to said carriage to permit tilting of said supporting member and the grinding means carried thereby from a lying position in which said supporting member is at least partially located in said recess means to a certain upright position in which said grinding means is in a position to grind said slicing knife, and vice versa, an abutment plate slidably supported by said supporting means and adjustable from one end position to another end position toward and away from said slicing knife in the direction of the longitudinal extension of the axis of rotation thereof for determining the respective thickness of the slices to be cut by said slicing knife from the meat goods to be sliced, and abutment means connected to said carriage for engagement with said abutment plate, the arrangement being such that said supporting member is tiltable into said certain upright position only when said abutment plate is in a certain one of said two end positions.

5. A slicing machine according to claim 4, in which said abutment plate is provided with abutment means for engagement with said carriage to locate the feeding movement of the latter and thereby of said grinding means toward said slicing knife.

6. In a slicing machine for meat and sausage: supporting means, a motor-operable circular slicing knife carried by said supporting means, a carriage reciprocably supported by said supporting means and provided with recess means, said carriage being movable selectively toward and away from said slicing knife, grinding means for grinding said slicing knife, a supporting member rotatably supporting said grinding means, pivot means pivotally connecting said supporting member to said carriage to permit tilting of said supporting member and the grinding means carried thereby from a lying position in which said supporting member is at least partially located in said recess means to a certain upright position in which said grinding means is in a position to grind said slicing knife, and vice versa, said carriage having a lower section and an upper section, one of said sections being provided with a bolt and the other one of said sections being provided with an extension adapted to straddle said bolt, and means engaging said bolt and operable to detachably clamp said extension on said bolt to thereby detachably connect said sections to each other.

No references cited.

WILLIAM W. DYER, JR., *Primary Examiner.*

JAMES M. MEISTER, *Examiner.*